Figure 1:
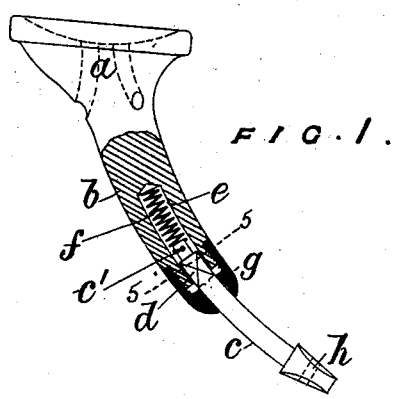

(No Model.)

A. M. LONGSHORE-POTTS.
PESSARY.

No. 606,565.  Patented June 28, 1898.

WITNESSES.
F. M. Hanaford
Julius Ruh

INVENTOR:
Anna M. Longshore-Potts
BY Munn & Co.
ATTORNEYS.

United States Patent Office.

ANNA MARY LONGSHORE-POTTS, OF LONDON, ENGLAND, ASSIGNOR OF ONE-HALF TO GEORGE EDWARD HARRISON, OF SAME PLACE.

PESSARY.

SPECIFICATION forming part of Letters Patent No. 606,565, dated June 28, 1898.

Application filed December 2, 1897. Serial No. 660,508. (No model.) Patented in England November 12, 1896, No. 25,473.

*To all whom it may concern:*

Be it known that I, ANNA MARY LONGSHORE-POTTS, doctor of medicine of the Woman's Medical College of Philadelphia, United States of America, residing at 32 Dorset Square, Regent's Park, London, N. W., England, have invented a new and useful Improved Pessary, (for which I have obtained Letters Patent in the following country, namely: Great Britain, dated November 12, 1896, No. 25,473,) of which the following is a full, clear, and exact description.

This invention relates to an improved pessary of the kind known as a "spring-stem" pessary, and has for its object to remedy the defects to which such instruments as now made are subject.

Heretofore the spring-stem of the pessary has sometimes been slotted and traversed by a cross-pin to limit its motion; but such construction is not effectual to prevent a certain amount of prejudicial displacement of the cup or body portion of the instrument from its proper position and has prevented the taking of the instrument to pieces for cleaning. In other forms of the same instrument which do admit of being taken to pieces the defect of liability to displacement of the cup or body portion in consequence of the movements of the body is much greater, and the component parts, being entirely separable, are liable to be lost when the instrument is taken to pieces for cleaning.

The object of the improvements is to enable the parts to be easily separated, so as to give sufficient access to the interior for the purpose of cleaning, without liability of loss by the multiplicity of loose parts, and at same time to prevent any relative motion of the cup or body portion and of the spring-stem which would permit of the displacement of the instrument from its proper position or other than a true sliding motion of the stem necessary to bring the elasticity of the spring into play, so as to enable the yielding pressure to be maintained which is requisite for the due support of the uterus. This object is effected by forming the stem with a head of square or other angular form, sliding in the manner of a piston within a bore of corresponding form within the neck of the body portion, the spring being permanently attached to the inner end of the stem and the screw-cap, by which the piston-like portion of the stem is retained within the bore, being confined between the piston-like head and the outer head of the stem, through which the elastic supporting-cords pass, so that by unscrewing the cap the spring and stem may be wholly withdrawn and the interior portions of the instrument may be thoroughly cleaned without further separation of the parts.

This improved construction is illustrated in the accompanying drawings, forming part of this specification, wherein—

Figure 2:
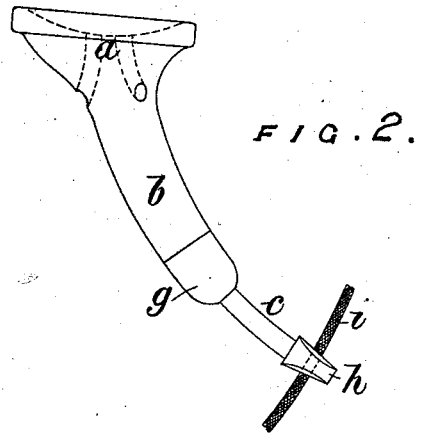
Figure 4:
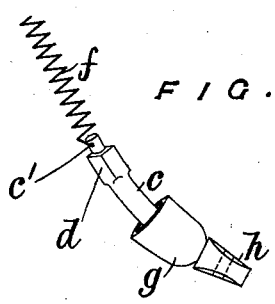
Figure 3:
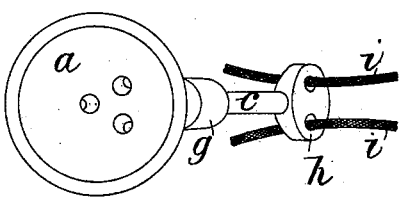
Figure 5:

Figure 1 is a longitudinal section, Fig. 2 an external view, and Fig. 3 a top view, of the instrument, while Fig. 4 shows the spring-stem separately; and Fig. 5 is a section on line 5 5, Fig. 1.

$a$ is the cup by which the uterus is received and supported, perforated with the usual apertures and formed with a curved neck or body portion $b$, adapted to the shape of the cavity in which it is received.

$c$ is the spring-stem, provided at the inner end with a head $d$ of square section, fitting accurately in a bore $e$ of corresponding form in the body portion $b$, the stem $c$ and bore $e$ being curved in the direction of their length to correspond to the curvature of the portion $b$.

$f$ is the spring confined between the inner end of the stem and of the bore $e$ and passed through a hole or otherwise attached to an inner prolongation $c'$ of the stem. The stem $c$ is of round section and slides through a cap $g$, which is threaded to screw upon the correspondingly-screwed end of the body portion $b$, so as to retain the piston-head $d$ of the stem in the bore. At the outer end the stem terminates in the usual cross-head $h$, provided with holes, through which pass the usual supporting-cords $i$, connected to the waist-belt or other body attachment.

I claim—

1. In a pessary, the combination with the neck of the cup having its end screw-threaded and provided with a bore angular in cross-section, of a stem having its inner end of a shape corresponding to that of the bore of the neck, a spring in the bore of the neck and having one end secured to the stem, and a screw-cap on the end of the neck and through which the stem loosely slides, substantially as described.

2. In a pessary, the combination with the neck of the cup having its end screw-threaded and provided with a bore square in cross-section, of a stem having a square head fitting in the bore of the neck and provided with a reduced extension beyond the head, a spring in the bore of the neck and having one end secured to the extension of the stem, and a screw-cap on the end of the neck and through which the stem loosely slides, substantially as herein shown and described.

Signed by me, the said ANNA MARY LONGSHORE-POTTS, this 18th day of November, 1897.

ANNA MARY LONGSHORE-POTTS.

In presence of—
  H. Y. HAIGH,
  E. J. CHATTERS.